US012620728B2

(12) United States Patent
Burnett et al.

(10) Patent No.: US 12,620,728 B2
(45) Date of Patent: May 5, 2026

(54) ISOLATION SWITCH AND TERMINAL RINGS

(71) Applicant: EDGEWOOD ENTERPRISES, LLC, Pawtucket, RI (US)

(72) Inventors: Ewan Burnett, Watrous, NM (US); Marek Marak, Urcice (CZ)

(73) Assignee: EDGEWOOD ENTERPRISES, LLC, Pawtucket, RI (US)

( * ) Notice: Subject to any disclaimer, the term of this patent is extended or adjusted under 35 U.S.C. 154(b) by 289 days.

(21) Appl. No.: 18/437,528

(22) Filed: Feb. 9, 2024

(65) Prior Publication Data

US 2025/0260183 A1 Aug. 14, 2025

(51) Int. Cl.

*H01R 9/24* (2006.01)
*H01H 19/08* (2006.01)
*H01H 19/14* (2006.01)
*H01H 19/36* (2006.01)
*H01R 4/2495* (2018.01)
*H01R 4/2404* (2018.01)

(52) U.S. Cl.

CPC ........... *H01R 9/2433* (2013.01); *H01H 19/08* (2013.01); *H01H 19/14* (2013.01); *H01H 19/36* (2013.01); *H01R 4/2495* (2013.01); *H01H 2225/01* (2013.01); *H01R 4/2404* (2013.01)

(58) Field of Classification Search

CPC .. H01R 9/2433; H01R 4/2495; H01R 4/2404; H01R 33/955; H01R 9/24; H01H 19/08; H01H 19/14; H01H 19/36; H01H 2225/01

USPC .......................................................... 200/568

See application file for complete search history.

(56) References Cited

U.S. PATENT DOCUMENTS 9,728,354 B2 8/2017 Skolozdra et al.
12,170,177 B2 * 12/2024 Widtmann ............. H01H 19/36

* cited by examiner

*Primary Examiner* — Lheiren Mae A Caroc

(74) *Attorney, Agent, or Firm* — INNOVATION CAPITAL LAW GROUP, LLP; Vic Lin

(57) ABSTRACT

An isolation switch includes a plurality of posts connectable to trace lines and/or a ground line at one side of a housing of the switch. Inside the switch, a conducting contact plate can be moved between a bonded mode, where each of the terminals are interconnected, and a test mode, where the contact plate moves, within the housing, electrically isolating each post and allowing for discrete locating.

18 Claims, 6 Drawing Sheets

ISOLATION SWITCH AND TERMINAL RINGS

BACKGROUND OF THE INVENTION

1. Field of the Invention

Embodiments of the invention relate generally to an isolation switch and terminal rings for connecting wires thereto. More particularly, embodiments of the invention relate to an isolation switch that includes a knob that can be turned to move an internal contact plate that can removably interconnect a ground terminal with a plurality of trace terminals.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Locating buried utilities using electromagnetic locating equipment involves applying an alternating current (AC) to the utility and tracing it with a locator. Applying AC to the utility requires the utility to be metal. Dielectric fiber optic cables, water, wastewater and natural gas pipes, however, are often made of plastics. In these cases, a tracer wire may be run alongside the utility.

A tracer wire is a type of insulated wire that is specifically used to assist with locating buried utilities. During installation, the tracer wire is buried along the length of the pipe. When the pipe needs to be located, the wire can be traced instead of the utility. The transmitter applies a radio frequency signal to the tracer wire, which can then be located using a receiver set to the same frequency.

It is common to bond harnesses for electrically conductive tracer wires at a terminal and to provide a ground connection. Such terminals are located at or in utility marker posts, pedestals, cabinets, manholes, vaults and enclosures.

When a specific line is to be tested, it is necessary to unbond the wire to be located to isolate the line. Conventional isolation of the lines typically requires that the connections be removed for the various lines to be tested and for the connections to be reattached after the testing to ensure the proper bonding and grounding. The conventional methods are inefficient and furthermore are often problematic when the bonding is not properly reconnected after the testing is complete. If each of the lines or multiple lines are to be tested, then each of the harnesses must be disconnected and properly reconnected.

In view of the foregoing, there is a need for an improved isolation switch for removing the bond between a tracer wire and ground.

SUMMARY OF THE INVENTION

Embodiments of the present invention provide an isolation switch comprising a housing; a plurality of posts extending in the housing; a contact plate disposed within the housing; a plurality of openings in the contact plate, the plurality of openings having respective ones of the plurality of posts extending therethrough; and a switch accessible from outside of the housing, the switch movable between a bonded position, where each of the plurality of posts are electrically connected via the contact plate, and a test position, where the switch moves the contact plate, within the housing, to electrically disconnect each of the plurality of posts from the contact plate.

Embodiments of the present invention further provide an isolation switch comprising a housing; a plurality of posts extending in the housing; a contact plate disposed within the housing; a plurality of openings in the contact plate, the plurality of openings having respective ones of the plurality of posts extending therethrough; and a switch accessible from outside of the housing, the switch movable between a bonded position, where each of the plurality of posts are electrically connected via the contact plate, and a test position, where the switch moves the contact plate, entirely within the housing, to electrically disconnect each of the plurality of posts from the contact plate, wherein the switch includes a cam lever attached to a back side of the switch, within the housing; the contact plate includes an L-shaped opening for receiving the cam lever therein; and turning the switch causes the cam lever to rotate between being positioned in a first leg of the L-shape to a second leg of the L-shape.

Embodiments of the present invention also provide an isolation switch comprising a housing; a plurality of posts extending in the housing; a contact plate disposed within the housing; a plurality of openings in the contact plate, the plurality of openings having respective ones of the plurality of posts extending therethrough; a switch accessible from outside of the housing, the switch movable between a bonded position, where each of the plurality of posts are electrically connected via the contact plate, and a test position, where the switch moves the contact plate, entirely within the housing, to electrically disconnect each of the plurality of posts from the contact plate; and a plurality of contact extensions extending away from a plane of the contact plate, wherein each of the plurality of contact extensions providing electrical contact from the contact plate to the plurality of posts when the isolation switch is in the bonded position; and the plurality of contact extensions have a first leg electrically connected to the contact plate, and a second leg, extending at an angle from the contact plate.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
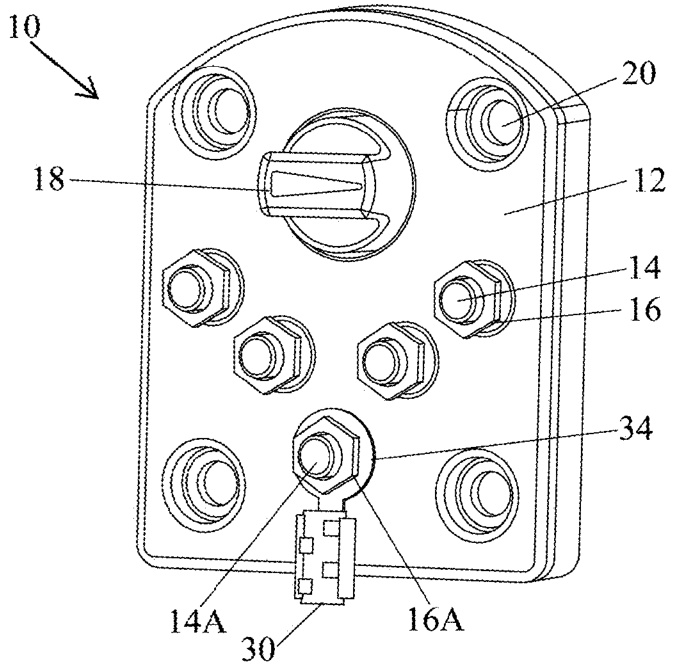
FIG. 1 illustrates a front perspective view of an isolation switch according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an isolation switch that includes a plurality of terminals connectable to trace lines at one side of a housing of the switch. Inside the switch, a conducting contact plate can be moved between a bonded mode, where each of the terminals are interconnected, and a test mode, where the contact plate moves upwards, within the housing, isolating each post and allowing for discrete locating.

Referring to FIG. 1, an isolation switch 10 can include a front housing 12 having a plurality of posts 14 extending therethrough. Each of the posts 14 can have male threads operable to receive a nut 16, permitting a terminal ring 34 (an example of which is described below) to electrically connect to the post 14. In some embodiments, there may be from one to eight posts 14, typically from three to six posts 14. In some embodiments, one of the posts may be considered a ground post 14A having a ground post nut 16A to attach a ground wire 30 thereto. The front housing 12 can include a plurality of mounting holes 20 formed therethrough. In some embodiments, the mounting holes 20 can be spaced apart to fit a marking post (not shown) to which the isolation switch 10 may be attached. A knob 18 may be accessible from the front of the isolation switch. As discussed in greater detail below, turning the knob 18 can switch between a bonded mode, where each of the posts 14 are electrically connected (bonded), and a test mode, where each of the posts 14 are isolated to permit discrete locating of buried utilities, for example.

Figure 2:
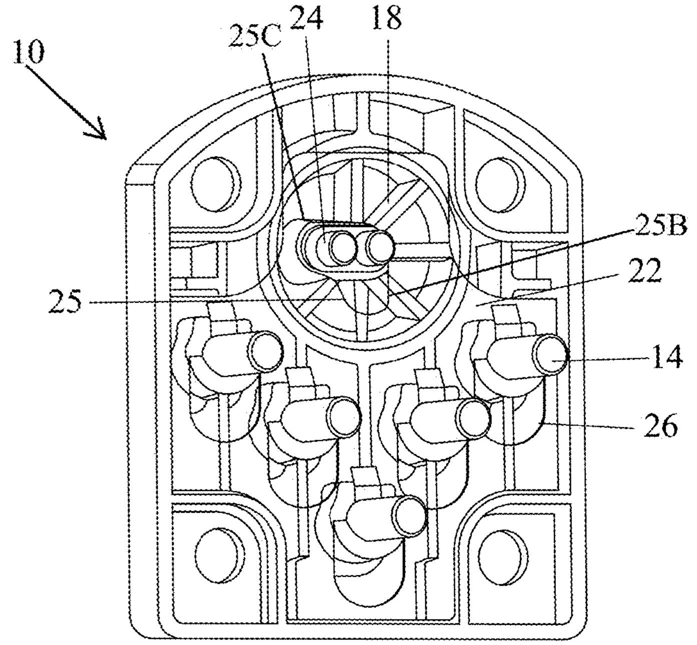
FIG. 2 illustrates a back perspective view of the isolation switch of FIG. 1 in a bonded mode.
Figure 3:
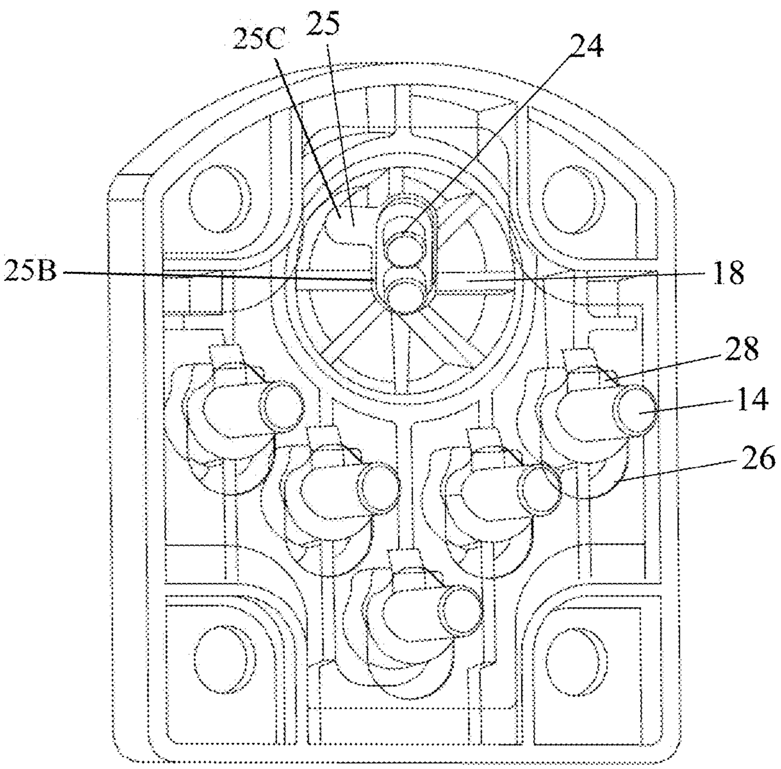
FIG. 3 illustrates a back perspective view of the isolation switch of FIG. 1 in a test mode to isolate each post to permit discrete locating.

Referring to FIGS. 2 and 3, a back side of the front housing 12 is shown. A contact plate 22 can be movably disposed within the housing 12. The contact plate 22 may be disposed entirely within the housing 12 in both the test mode and the bonded mode, as can be seen in FIG. 2 (bonded mode) and FIG. 3 (test mode). The switch 18 can include an elongated arm 24 (also referred to as a cam lever 24) that extends from the back side of the switch 18. The cam lever 24 can have a longitudinal axis that extends from a central region of the switch 18 toward an outer edge of the switch 18. The cam lever 24 can be fixed to the back side of the switch 18 (for example, the cam lever 24 may be attached to or formed integrally with the switch 18) so that rotation of the switch 18 causes rotation of the cam lever 24.

FIG. 2 shows the cam lever 24 in a generally horizontal arrangement, positioned in a first leg 25C of an L-shaped opening 25, which, due to the L-shaped opening 25 in the contact plate 22, causes the contact plate 22 to be in the bonded mode. FIG. 3 shows the cam lever in a generally vertical arrangement, positioned in a second leg 25B of the L-shaped opening, causing the contact plate 22 to move upward and to no longer contact any of the posts 14 (test mode). A plurality of openings 26 is formed in the contact plate 22 so that each post 14 can extend through one of the plurality of openings 26. The openings 26 are sized so that, when the contact plate 22 is moved to the test mode, the posts 14 are centrally located in the openings 26, without making electrical contact with the contact plate 22. In some embodiments, the openings 26 can include an outward protrusion 28 that is sized and has a shape to contact the post 14 along at least a portion of the curvature of the post 14. For example, the outward protrusion 28 may be sized and shaped so that the post 14 contacts the contact plate 22 along 30 to 50 percent of the outer periphery of the post 14. Such a shaped outward protrusion 28 provides improved contact area between the post 14 and the contact plate 22 when the isolation switch is in the bonded mode (FIG. 2).

Figure 4:
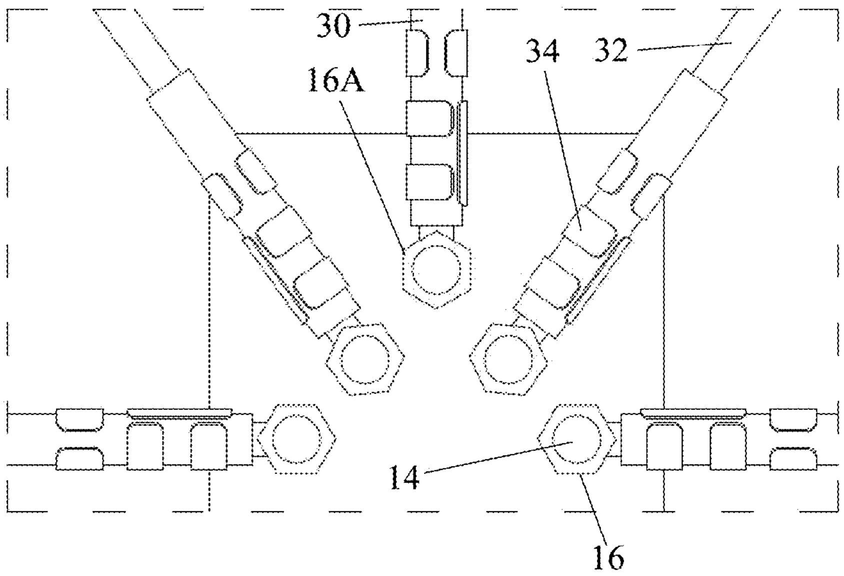
FIG. 4 illustrates a front view of locating wires attached to posts of the isolation switch of FIG. 1.

FIG. 4 shows the ground wire 30 and a plurality of trace wires 32 connected to the posts 14 with a ring terminal 34.

Figure 5:
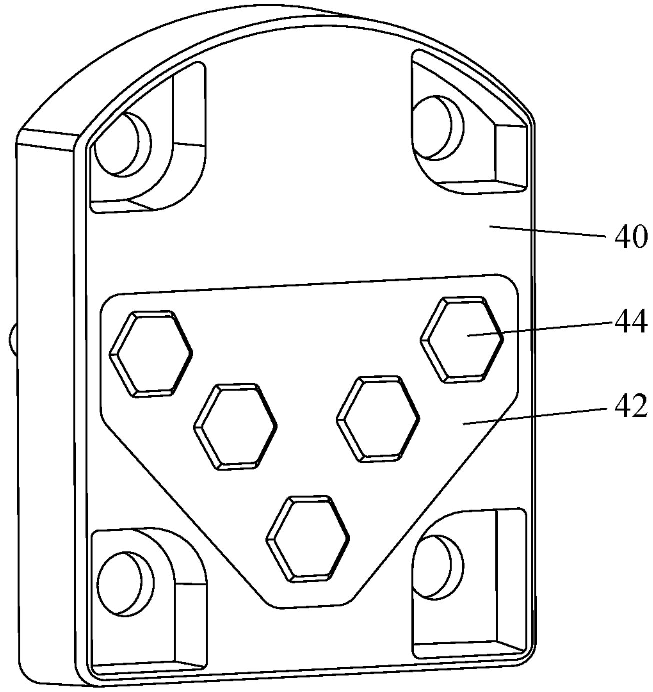
FIG. 5 illustrates a back perspective view of a housing for a back side of the isolation switch of FIG. 1, with a cover removed.
Figure 6:
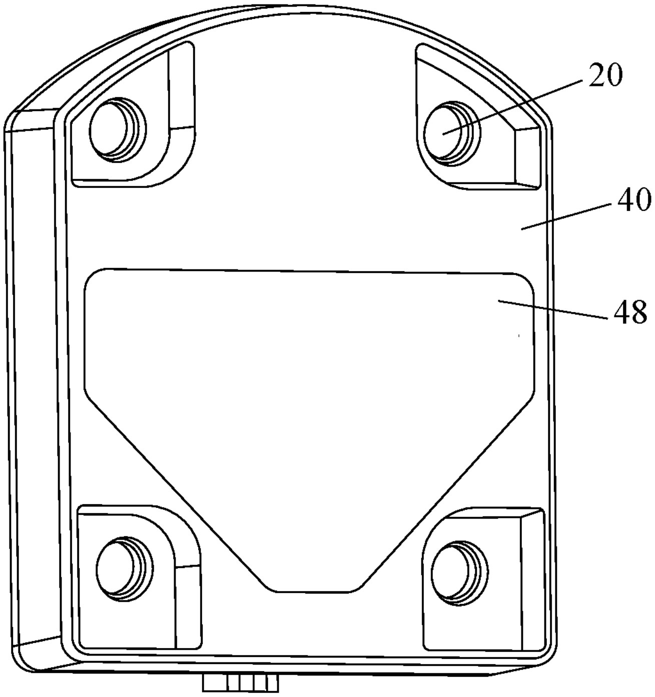
FIG. 6 illustrates a back perspective view of the housing of FIG. 5 with a cover positioned to cover the ends of the posts.

Referring to FIGS. 5 and 6, a back housing 40 of the isolation switch is shown. A post head 44 may fit into a recess formed in the back housing 40 so that free rotation of the post 14 is prevented. For example, as shown, the recess may be a hexagonal shape to fit a hexagonal post head 44 therein. A cover 46 can fit over a recessed region 42 of the back housing 40 to cover the post heads 44 and to provide a flush back housing 40.

Figure 7:
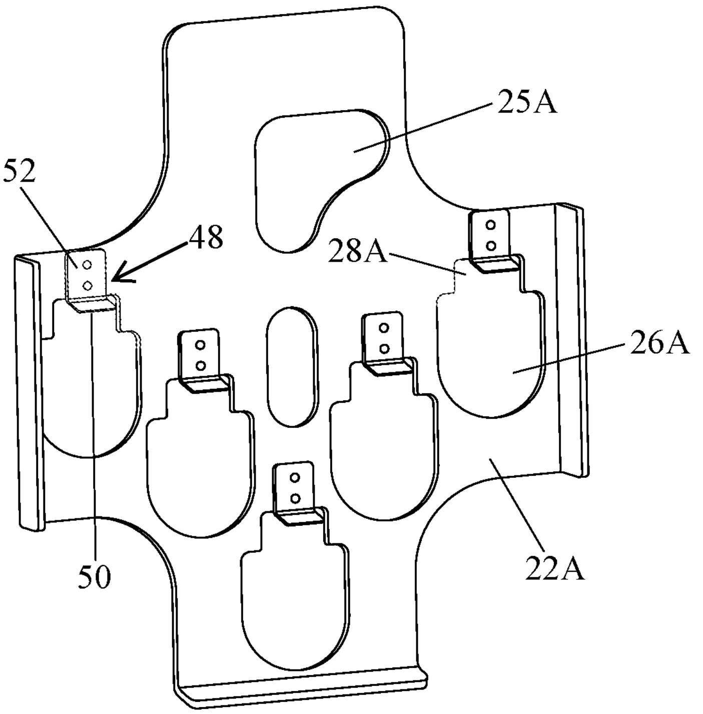
FIG. 7 illustrates a back side view of a plate member of the isolation switch of FIG. 1, having contact plates extending inward of the plate member for providing additional contact with the posts with the isolation switch is in the bonded mode.
Figure 8:
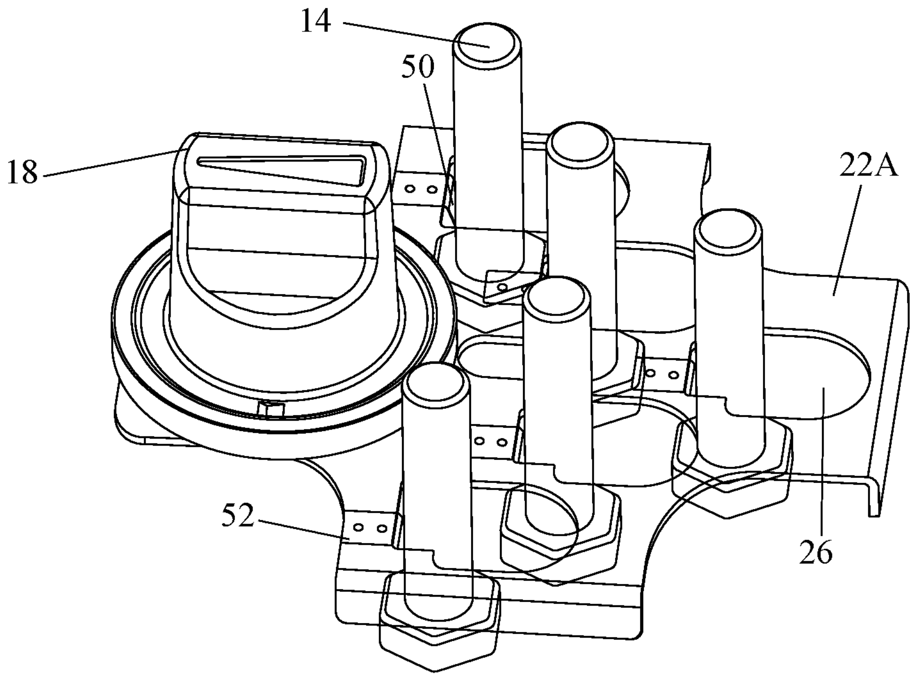
FIG. 8 illustrates the plate member of FIG. 7 engaging with posts of the isolation switch.

Referring to FIGS. 7 and 8, a contact plate 22A can be designed in a similar manner as the contact plate 22 described above. For example, the contact plate 22A can include a plurality of openings 26A through which the posts 14 can extend. The openings 26A are sized to permit contact between the posts 14 and the contact plate 22A when in the bonded mode (as shown in FIG. 8) and can electrically disconnect the posts 14 from the contact plate 22A when in the test mode. The openings 26A can include an outward protrusion 28A, sized to receive the post 14 therein, similar to the outward protrusion 28, discussed above. Further, the contact plate 22A can include a switch opening 25A that can permit movement of the contact plate 22A via turning of the switch 18, as discussed above.

In some embodiments, the contact plate 22A can include a plurality of contact extensions 48 that can be formed in a generally L-shape, with one leg 52 electrically connected to the contact plate 22A and the other leg 50 extending to form an angle with the contact plate 22A. This angle is typically from about 80 degrees to about 90 degrees, so that, when in the bonded state (FIG. 8), the leg 50 can extend along and contact the post 14, thus providing added electrical contact between the contact plate 22A and the post 14. Of course, the contact plate 22A (as well as the contact plate 22, described above) and the contact extensions 48 are formed from an electrically conductive material, such as aluminum, copper, steel, or the like.

Referring to FIGS. 9 through 15, a ring terminal 34 is shown. The ring terminal 34 may be useful to attach wire used as a tracer wire, such as Trace-Safe® RT or TST wire, for example. The ring terminal 34 can include a ring end 60, having an opening 61 formed therein, where the opening 61 is sized to fit about the posts 14.

A body portion 62 can electrically extend from the ring end 60 and can include a plurality of bendable legs 66 extending upward therefrom, and a pair of alignment legs 68 as a distal end (relative to the ring end 60) of the body portion 62. The bendable legs 66 can bend about the wire (such as ground wire 30 or trace wire 32, as shown in FIG. 4) to retain the wire in the ring terminal 34.

Figure 11:
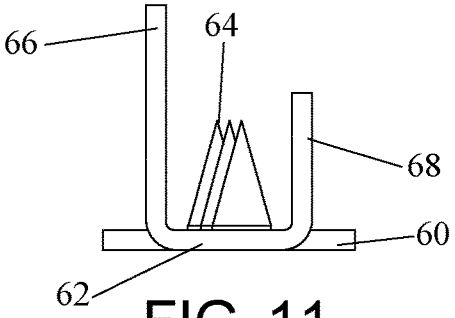
FIG. 11 illustrates an end view of the terminal ring of FIG. 9.
Figure 12:
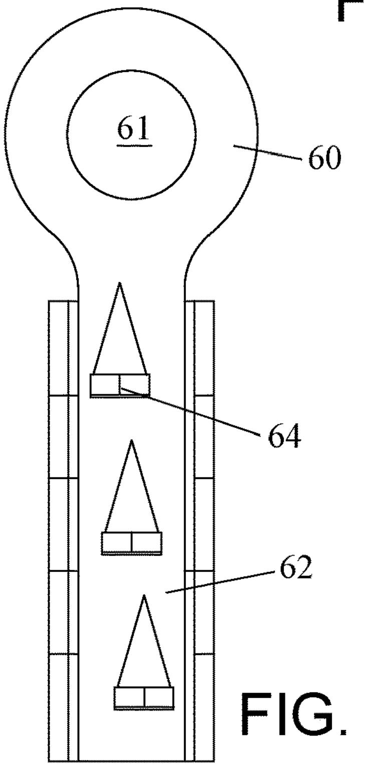
FIG. 12 illustrates a top view of the terminal ring of FIG. 9.
Figure 13:
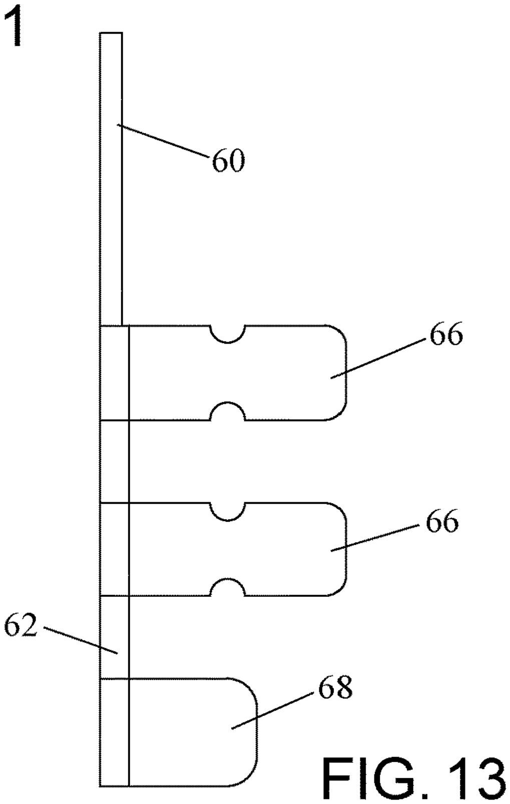
FIG. 13 illustrates a side view of the terminal ring of FIG. 9.
Figure 15:
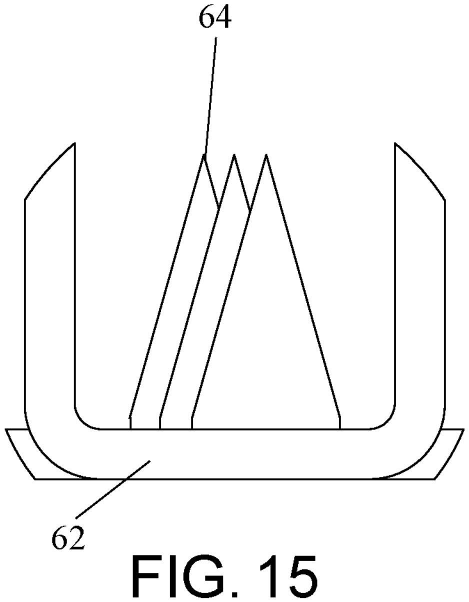
FIG. 15 illustrates a detailed end view of the terminal ring of FIG. 9, showing staggered piercing wire contacts.

A plurality of piercing members 64 can extend upward from the body portion 62 so that, when a wire is placed between the bendable legs 66, the wire can be pressed into the piercing members 64, permitting the piercing members 64 to pierce through the sheath of the wire to contact the electrical conductor of the wire. Thus, when the wire is placed into the ring terminal 34, and the ring terminal 34 is attached to the post 14 with the nut 16, the wire is electrically connected to the post 14. In some embodiments, a plurality of piercing members 64 are provided with a radial offset, as best seen in FIGS. 11 and 15.

Figure 9:
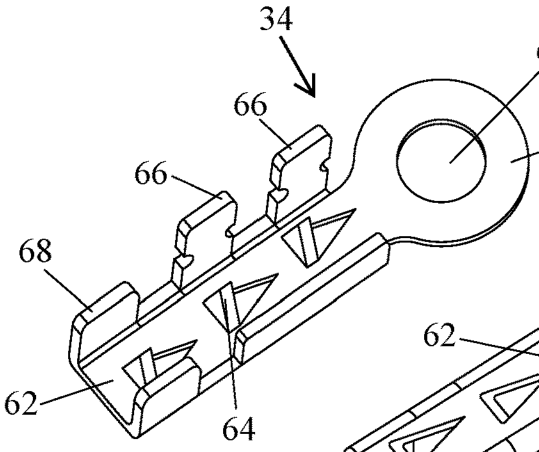
FIG. 9 illustrates a top perspective view of a terminal ring for attaching wires to the posts of the isolation switch, according to an exemplary embodiment of the present invention.
Figure 10:
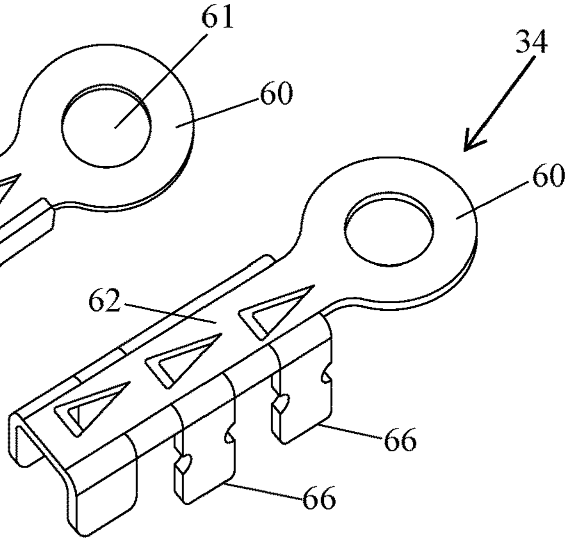
FIG. 10 illustrates bottom perspective view of the terminal ring of FIG. 9.
Figure 14:
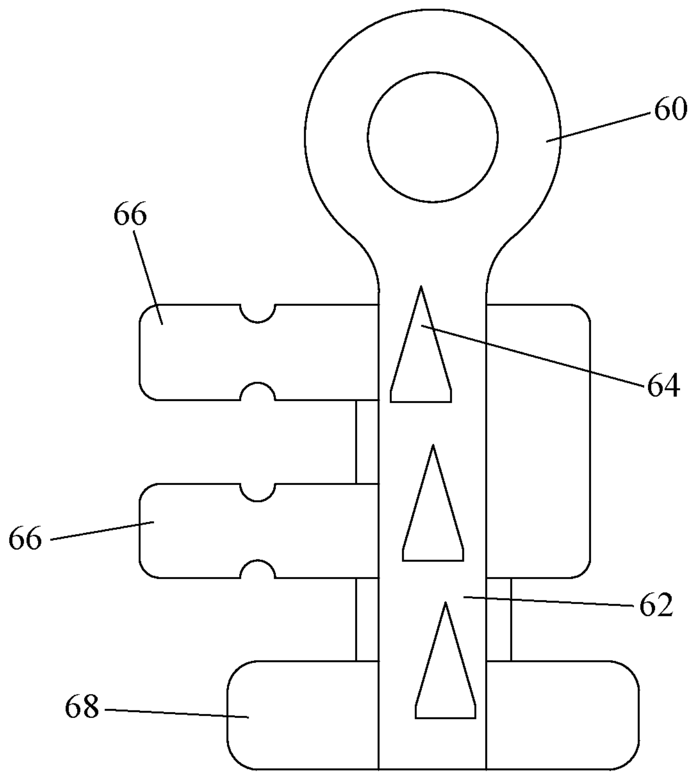
FIG. 14 illustrates top view of the terminal ring of FIG. 9 in a flattened state.

As shown in FIG. 14, the ring terminal 34 may be stamped in a flat form and then shaped by machine, or by the end user, into the shape shown in FIGS. 9 and 10.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An isolation switch comprising:
a housing;
a plurality of posts extending in the housing;
a contact plate disposed within the housing;
a plurality of openings in the contact plate, the plurality of openings having respective ones of the plurality of posts extending therethrough; and
a switch accessible from outside of the housing, the switch movable between a bonded position, where each of the plurality of posts are electrically connected via the contact plate, and a test position, where the switch moves the contact plate, within the housing, to electrically disconnect each of the plurality of posts from the contact plate,
wherein the switch includes a cam lever attached to a back side of the switch, within the housing.

2. The isolation switch of claim 1, wherein:
the contact plate includes an L-shaped opening for receiving the cam lever therein; and
turning the switch causes the cam lever to rotate between being positioned in a first leg of the L-shaped opening to a second leg of the L-shaped opening.

3. The isolation switch of claim 1, wherein the plurality of posts extend from a back side of the housing to beyond a front side of the housing.

4. The isolation switch of claim 3, wherein the plurality of posts each include a nut for attachment of a wire to a front side of the isolation switch, external to the housing.

5. The isolation switch of claim 3, wherein the plurality of posts and the switch are both disposed, external the housing, at a front side of the isolation switch.

6. The isolation switch of claim 1, further comprising a plurality of contact extensions extending away from a plane of the contact plate, each of the plurality of contact extensions providing electrical contact from the contact plate to the plurality of posts when the isolation switch is in the bonded position.

7. The isolation switch of claim 6, wherein the plurality of contact extensions have a first leg electrically connected to the contact plate, and a second leg, extending at an angle from the contact plate.

8. The isolation switch of claim 7, wherein the angle is from about 80 degrees to about 90 degrees.

9. The isolation switch of claim 1, wherein one of the plurality of posts is a ground wire post and remaining ones of the plurality of posts are operable to attach to tracer wires for underground utilities.

10. An isolation switch comprising:
a housing;
a plurality of posts extending through the housing;
a contact plate disposed within the housing;
a plurality of openings in the contact plate, the plurality of openings having respective ones of the plurality of posts extending therethrough; and
a switch accessible from outside of the housing, the switch movable between a bonded position, where each of the plurality of posts are electrically connected via the contact plate, and a test position, where the switch moves the contact plate, entirely within the housing, to electrically disconnect each of the plurality of posts from the contact plate, wherein:
the switch includes a cam lever attached to a back side of the switch, within the housing;
the contact plate includes an L-shaped opening for receiving the cam lever therein; and
turning the switch causes the cam lever to rotate between being positioned in a first leg of the L-shaped opening to a second leg of the L-shaped opening.

11. The isolation switch of claim 10, wherein:
the plurality of posts extend from a back side of the housing to beyond a front side of the housing; and
the plurality of posts each include a nut for attachment of a wire to a front side of the isolation switch, external to the housing.

12. The isolation switch of claim 10, wherein the plurality of posts and the switch are both disposed, external the housing, at a front side of the isolation switch.

13. The isolation switch of claim 10, further comprising a plurality of contact extensions extending away from a plane of the contact plate, wherein:
each of the plurality of contact extensions providing electrical contact from the contact plate to the plurality of posts when the isolation switch is in the bonded position; and
the plurality of contact extensions have a first leg electrically connected to the contact plate, and a second leg, extending at an angle from the contact plate.

14. The isolation switch of claim 13, wherein the angle is from about 80 degrees to about 90 degrees.

15. An isolation switch comprising:
a housing;
a plurality of posts extending through the housing;
a contact plate disposed within the housing;
a plurality of openings in the contact plate, the plurality of openings having respective ones of the plurality of posts extending therethrough;
a switch accessible from outside of the housing, the switch movable between a bonded position, where each of the plurality of posts are electrically connected via the contact plate, and a test position, where the switch moves the contact plate, entirely within the housing, to electrically disconnect each of the plurality of posts from the contact plate; and
a plurality of contact extensions extending away from a plane of the contact plate, wherein:
each of the plurality of contact extensions providing electrical contact from the contact plate to the plurality of posts when the isolation switch is in the bonded position; and
the plurality of contact extensions have a first leg electrically connected to the contact plate, and a second leg, extending at an angle from the contact plate.

16. The isolation switch of claim 15, wherein:
the switch includes a cam lever attached to a back side of the switch, within the housing;
the contact plate includes an L-shaped opening for receiving the cam lever therein; and turning the switch causes the cam lever to rotate between being positioned in a first leg of the L-shaped opening to a second leg of the L-shaped opening.

17. The isolation switch of claim 15, wherein:

the plurality of posts extend from a back side of the housing to beyond a front side of the housing;

the plurality of posts each include a nut for attachment of a wire to a front side of the isolation switch, external to the housing; and the plurality of posts and the switch are both disposed, external the housing, at a front side of the isolation switch.

18. The isolation switch of claim 15, wherein the angle is from about 80 degrees to about 90 degrees.

* * * * *